United States Patent

Sawyer et al.

[11] Patent Number: 5,339,312
[45] Date of Patent: Aug. 16, 1994

[54] STATION INTERFACE UNIT

[75] Inventors: Laurence D. Sawyer, Park City; Robert A. Lindsay, Bountiful; Steven C. Tate, Manti, all of Utah

[73] Assignee: Unisys Corporation, Blue Bell, Pa.

[21] Appl. No.: 32,574

[22] Filed: Mar. 17, 1993

[51] Int. Cl.[5] .......................................... H04L 29/12
[52] U.S. Cl. .................... 370/85.1; 370/85.14; 375/7
[58] Field of Search ............ 370/85.1, 85.7, 85.13, 370/92, 94.1, 95.3; 375/121, 7, 8, 36

[56] References Cited

U.S. PATENT DOCUMENTS

| | | | |
|---|---|---|---|
| 4,937,819 | 6/1990 | King | 370/85.7 |
| 5,136,580 | 8/1992 | Videlock et al. | 370/94.1 |
| 5,151,896 | 9/1992 | Bowman et al. | 370/85.13 |

*Primary Examiner*—Benedict V. Safourek
*Attorney, Agent, or Firm*—John B. Sowell; Mark T. Starr; Thomas J. Scott

[57] ABSTRACT

An improved interface unit for receiving a stream of parallel bit words from a source bus comprising an address field, a data field and a clock field. The parallel bit words are first phase adjusted and stored in an input register where the address field is compared in enable logic to determine whether to store the data field in a sink buffer register for processing. The word in the input register is coupled to the buffer storage register. The address field is further compared in pass through disable logic to determine whether to pass the address and data field to an output register or to generate a null code address in the address field of the word being outputted from the buffer storage register. The word in the buffer storage register is coupled through a word selector to an output register. A host source is also coupled to the word selector so that a source word may be written into the output register when a null code address is appended to a parallel bit word being supplied as an input to said word selector.

13 Claims, 3 Drawing Sheets

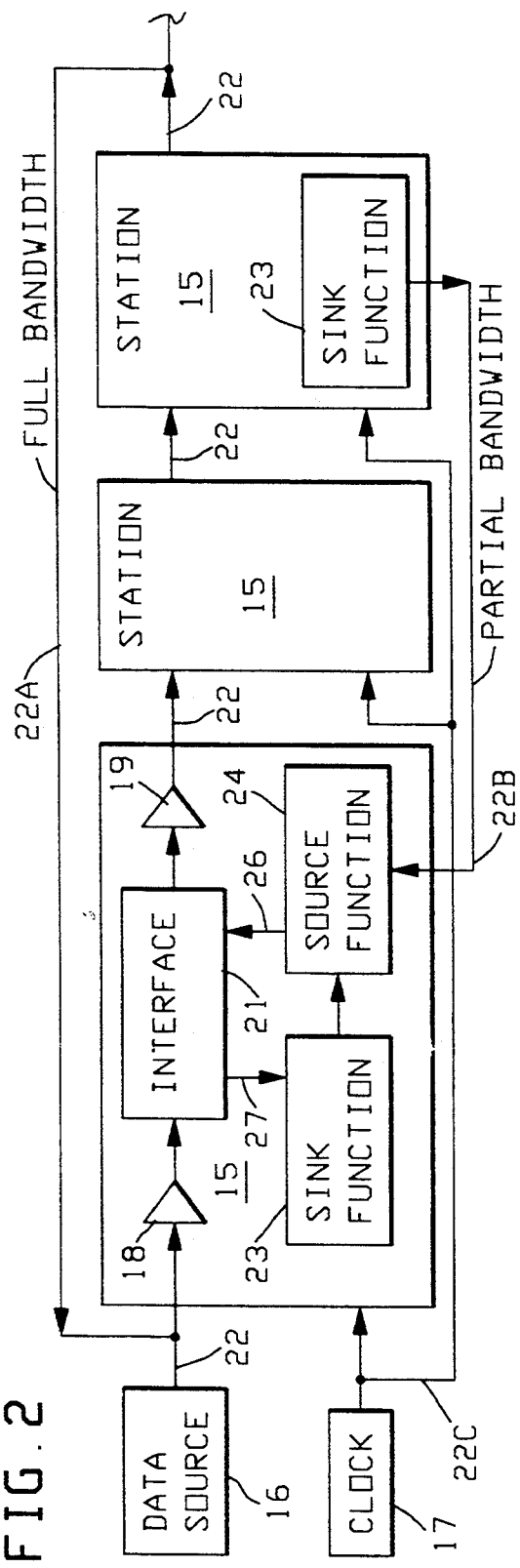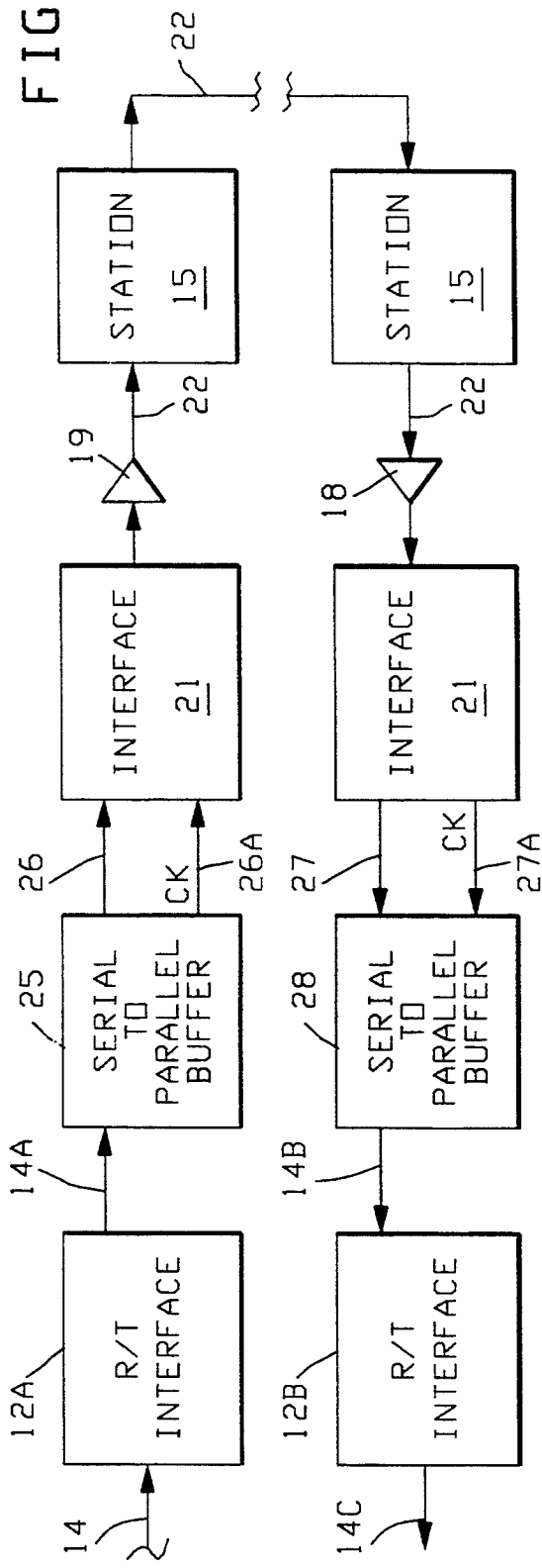

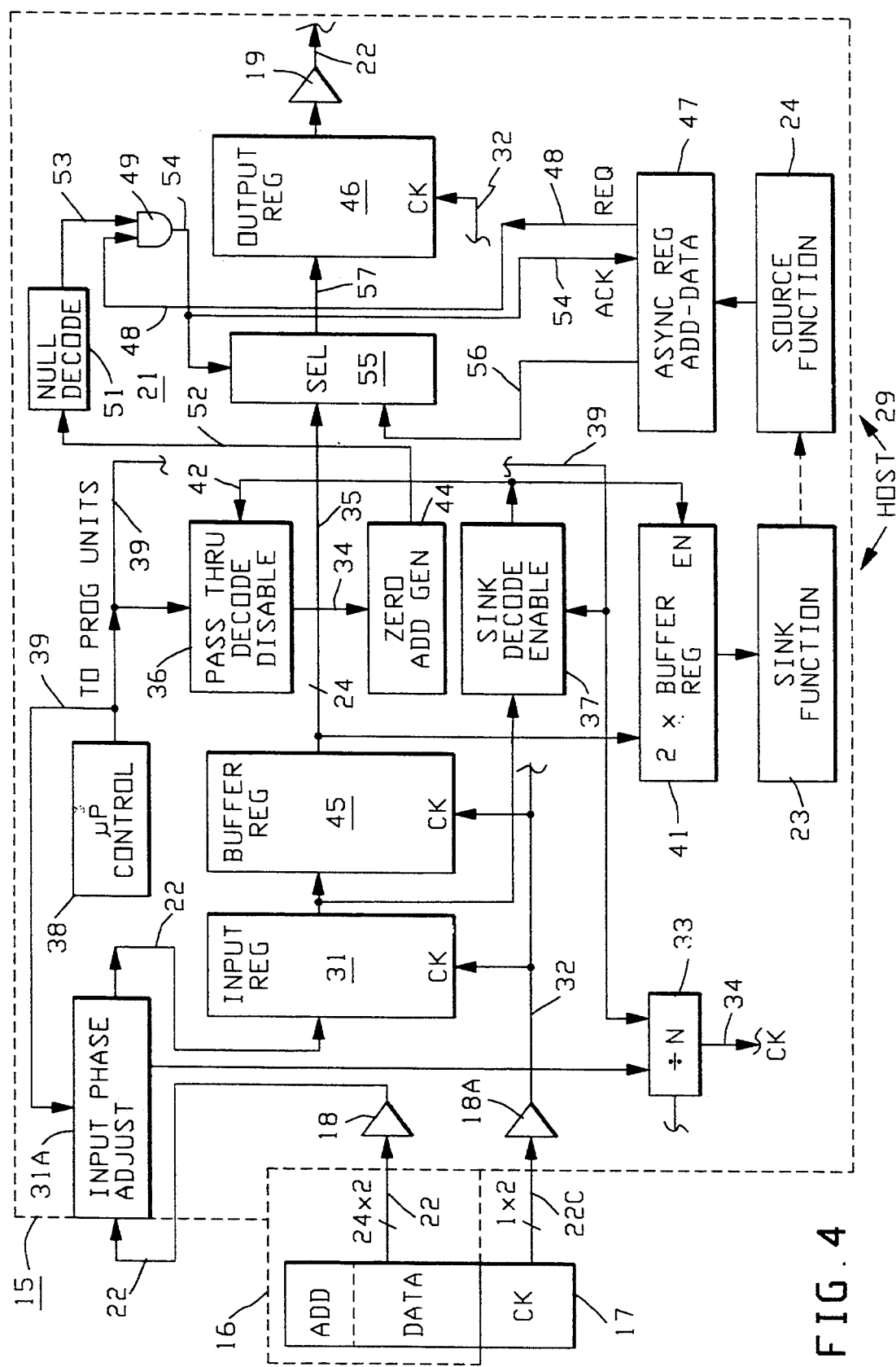

STATION INTERFACE UNIT

BACKGROUND OF THE INVENTION

1. Related Applications

This application relates to our co-pending U.S. application Ser. No. 08/032,575 filed Mar. 17, 1990 for an INTERFACE UNIT CIRCUIT WITH ON-CHIP TEST SIMULATION.

2. Field of the Invention

The present invention relates to interface units employed in networks and/or for interconnecting utilization function stations to a bus or cable. More particular, the present invention interface unit defines a protocol for efficiently receiving and transmitting data at stations that are interconnected by a daisy chain bus for operation in a modified Time Division Multiple Access (TDMA) mode of operation.

3. Description of the Prior Art

Heretofore local area networks (LANs) employing a shared bus master ring and interface units were known. In the prior art system the LAN stations contended for use of the bus, thus, units which did not have access to the bus required that the interface unit be provided with very large buffer capacity to store data. The need for buffer capacity increased further when one station was the bus master in all other stations did not have access to the bus. The situation became even more critical when one station had a long string of data to be transmitted or had a priority that denied other stations equal access to the bus in the network.

Such LANinterface units employed a protocol including a plurality of auxiliary bits in the message such as sync or header bits which were used to identify the start of the message and in some cases the message link. This was followed by source and/or destination bits which identified the address of the unit for which the data is intended. The source bits were followed by data which was optionally followed by a message trailer or end of message bits.

Heretofore, Time Division Multiple Access (TDMA) mode of operation networks have been employed to solve the aforementioned need for a large buffer capacity. In some prior art TDMA systems predetermined time slots were generated for each user station on the network. This type of network greatly reduced the utilization factor of the bus when some of the stations on the network left their time slots unused. Another problem with TDMA's network systems is that every time a new station is added to the network system, the protocol must be changed to accommodate new stations and provide new time slots. Heretofore, it was common practice to provide a protocol with more TDMA time slots than stations to provide for future station expansion on the network at the expense of the utilization factor.

Heretofore it was common practice to employ flexible ribbon cables, flexible fiber optic cables, flexible coaxial cables and custom motherboards (backplanes) to provide host to host bus interconnections. LAN network systems were originally designed to overcome the problem presented with the expense of designing custom motherboard bus systems for networks. All of these prior art interconnection systems present mechanical interconnection problems which are substantially avoided by the present novel interface unit.

SUMMARY OF THE INVENTION

The principle object of the present invention is to provide a novel unidirectional time slot LAN for interconnecting host stations, circuit card assemblies (CCAs) and line replaceable units (LRUs).

It is a principle object of the present invention to provide a self addressing word wide bus for transmitting packets of parallel data information in a time slot defined by one bit time duration.

It is a principle object of the present invention to provide a single word protocol for a word bus which comprises programmable variable data fields and variable address fields and an external clock field which defines a parallel bit word transfer.

It is another object of the present invention to provide a high speed data interface unit capable of operation at 200 mega words per second and which is compatible with other commercially available bus systems and can be used to pass other types of interface protocols.

It is another object of the present invention to provide a novel word bus interface unit which is independent of the type of interconnection between interfaces and stations.

It is another object of the present invention to provide a point to point interface connection unit which is plug compatible with a daisy chain motherboard.

It is another object of the present invention to provide a novel word bus interface unit which eliminates slot dependent motherboard designs.

It is another object of the present invention to provide a novel word bus interface unit for interconnecting stations for half or full duplex LAN operations.

According to these and other objects of the present invention there is provided a station interface unit for receiving a stream of data formatted into single parallel bit words each comprise an address field, a data field and a clock field for connection to a novel-interface having a unique address. Said station interface unit comprises a pair of receiver-drivers coupled to an input buffer register whose output is coupled to a decoder and to buffer register means and to sink register means controlled by said decoder. The output of the sink register means are coupled to a host function means. The output of said buffer register means which are controlled by said decoder means, generates a null output word or words when the address of said single parallel bit words compare with the unique address of the interface unit. The interface unit is adapted to pass through the single bit parallel words to an output register when the address of the interface units do not compare.

BRIEF DESCRIPTION OF THE DRAWINGS

FIG. 2 is a schematic block diagram showing a plurality of the present invention station interface units interconnected for half duplex mode of operation;

FIG. 3 is a schematic block diagram showing a plurality of the present invention interface units interconnected between two prior art stations, and FIG. 4 is a more detailed block diagram of the present invention interface unit.

DESCRIPTION OF THE PREFERRED EMBODIMENT

Figure 1:
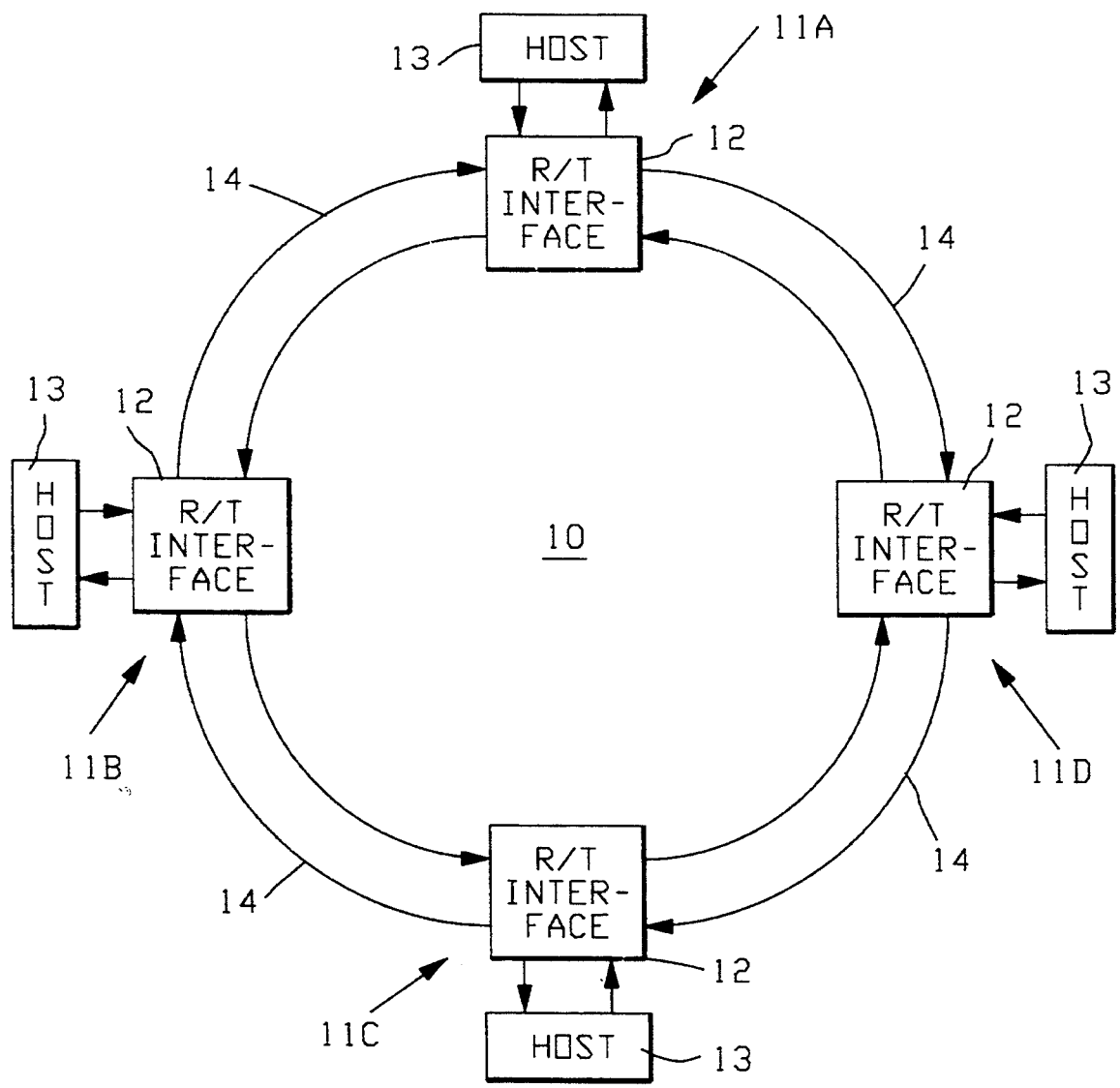
FIG. 1 is a generic schematic block diagram of a well known prior art token ring network having a plurality of stations.

Refer now to FIG. 1 showing a schematic block diagram of a well known prior art token ring network 10. The network 10 comprises four stations 11A through 11D and each station comprises receiver/transmitter (R/T) interface 12 coupled to a host function unit 13. In the usual preferred mode of operation for a LAN system the stations 11 are interconnected by flexible fiber optic cable for long interconnections, connected by ribbon cable for short interconnections and connected by co-axial cable for medium length interconnections. For extra long interconnections of such LAN networks, microwave transmitters and receivers are used on site which further require cable interconnections.

A token ring received its name because a token comprising sync information and flag information is placed in front of the message. The flag and the leader indicates whether or not and/or which station has taken control of the bus and has become Bus Master. When the Bus Master station finishes its operation and relinquishes its control of the bus the Bus Master changes the flag and the leader or token to permit other stations on the token ring to insert their flag information in the token space and become the Bus Master.

Several problems are recognized with a token ring network. The data transferred between stations is in a serial format whether the host interface is parallel or not. Once the Bus Master appropriates the bus all other stations may perform their host functions but require a large amount of buffer memory in order to store the information to be subsequently transmitted on the bus, if and when the bus can be acquired.

Refer now to FIG. 2 and a schematic block diagram showing a plurality of the present invention station interface units 15 connected in a half duplex mode of operation. The first station in the half duplex network is provided with a parallel data source 16 and an external clock 17. The novel interface unit 15 comprises a receiver 18 connected to a interface unit 21 which is further coupled to a transmitter 19. The transmitter 19 is provided with a network interconnection bus 22 employed to connect stations 15. In the first station 15 the host comprises a sink function 23 and a source function 24 which will be described in greater detail hereinafter. A half duplex network can be converted to a full duplex network by replacing the data source 16 with a full bandwidth interconnection cable 22A which is coupled back from the last station 15 to the input of the receiver 18. If the number of stations on the network becomes so long as to prevent reliable operation with the external clock 17 it is preferred that the sink function 23 in the last station be coupled via a partial bandwidth interconnection bus 22B back to the source function 24 in the first station. By making this partial bandwidth connection the external clock 17 is resynchronized when the information from the source function 24 is routed through interface 21 and outputted through transmitter 19.

It will be noted that the external clock 17 is employ as the clock supplying all of the stations 15 and that the source functions 24 in the stations 15 no longer require any type of buffering as required in the prior art token ring 10. Further, it will be noted that additional stations 15 may be added in the daisy chain shown up to a point where utilization of the full bandwidth available occurs without having to reconfigure the interface of any of the stations on the novel network. Further, the novel interface stations 15 are connected to each other by the novel point to point interface units 21 without the necessity for any discrete cables there between.

Refer now to FIG. 3 showing a schematic block diagram of a plurality of the present inventions stations 15 interconnected between two prior art interfaces 12A and 12B of the type used in prior art stations 11 shown in FIG. 1. The information on the cable or bus 14 is inputted into the receiver transmitter (R/T) interface 12A and outputted on another bus 14A at a frequency of up to 200 mega bits per second which can be achieved by ECL prior art token ring systems. The serial information on line 14 is inputted into a serial to parallel buffer 25 of the type which comprises a source function buffer 24. The buffer outputs the information on line 26 and outputs a clock on line 26A into a typical present invention interface unit 21 of the type shown in FIG. 2. The interface 21 outputs its information through a transmitter 19 onto a network interconnection bus 22 of the type shown in FIG. 2 to interconnect stations 15. The two stations 15 are shown connected by broken line bus 22 which indicates that additional stations may be added to the half duplex network.

The output from the last station 15 is in parallel format on line 22 and is inputted into receiver 18 which is coupled to a second interface 21. The output from the second interface 21 on line 27 is the same as that on sink bus 27 of the type shown in FIG. 2. The clock and information on bus 27 is coupled to a parallel to serial buffer 28 which provides a serial format identical to that on line 14A from interface 12A. The information on line 14A is inputted into interface 12B which produces the correct protocol formatted output information on line 14C.

It will be noted that the information on line 26 from serial to parallel buffer 25 is capable of 25 mega words per second using TTL semiconductor devices and capable of 200 mega words per second employing ECL semiconductor devices. Even higher speeds are obtainable employing Gallium Arsenide devices. Thus, the typical bandwidth of the novel interface 21 is capable of far exceeding the bandwidth of the prior art network systems. For example if the 200 mega bit per second words are divided into blocks of 20 bit parallel data, the frequency of the clock on 26A maybe reduced to 10 mega Hz and still accommodate the entire bandwidth of the input information. The interconnect bus 22 at the input of the first station 15 employing an external clock 17 of 200 mega Hz can accommodate 4 giga bits of data per second.

Further, it will be noted that the novel interfaces 21 do not require any software or hardware logic or information concerning the protocol of the token ring information, thus, the insertion of the novel stations 15 and interfaces 21 are completely transparent to the prior art systems and the only degradation is caused by the negligible delay through the station 15. Having explained how the novel station interface units 21 may be interposed between prior art types of stations employing the example of a token range station it will be apparent that the same interface structure may be interposed into ethernet systems, HiPPI systems, and other types of networks such as MIL STD 1553.

Refer now to FIG. 4 showing a more detailed block diagram of a present invention station 15 comprising an interface unit 21 and a host 29 Of the type shown in FIGS. 2 and 3. For the purpose of explaining FIG. 4 the data source 16 and a clock source 17 are shown as a parallel register which presents on busses 22 and 22C twenty four differential address and data bits and one differential clock bit respectively. Busses 22 and 22C are shown connected to receivers 18 and 18A to provide address, data and clock information as the input through phase adjuster 31A to register 31.

The input phase adjuster 31A is similar to standard input phase adjusting circuits in that it indicates to the microprocessor control unit 38 where data transitions are occurring so that the Host 29 processor can choose an input clock phase where data is stable. The single ended clock on line 32 is shown connected to a divide by N module 33 which produces an optional station clock on line 34 to the host 29. The output from input register 31 on line 35 is shown as being 24 bits wide, however, the sink decode enable logic 37 only requires that it receives the address bits which may comprise up to 8 bits of the 24 bits. The address bits are programmable by micro processor control unit 38 via its program bus 39 which is connected to the decode logic 36, sink decode logic 37 and the divide by N logic 33.

The data portion of the field on bus 35 is applied to the double buffer register 41 which is coupled by bus 27 to the sink function 23 of the host 29. When the unique interface 21 detects its own address in the sink decode enable logic 37 it generates an enable signal on line 42 which is coupled to the double buffer register 41 causing the information on bus 35 to be loaded therein. Under the Host 29 processor control the same data which produces an address match may be left on the bus by enabling the pass through enable function 36. If it does not detect an address match it generates a disable signal on line 43 which inhibits the generation of address zeros in the zero address generator 44 which would ordinarily fill the address portion of the information in buffer register 45 with zeros. Stated differently the information on bus 35 is passed though without alteration if the pass through decode disable logic 36 does not detect a match. Thus, the pass through decode disable logic 36 may be loaded to remove data or keep data on the bus, thus enabling the information on line 35 to be passed through to another station down the line as well as being passed through the sink function 23.

Assume that buffer register 45 is loaded with zeros in its address field and that the zeros define a null slot which may be used by other stations down the line. The information in buffer register 45 which may or may not define a null slot eventually will pass to output register 46. When information in source function block 24 in Host 29 is to be transferred to output register 46 it is presented via bus 26 to the asynchronous register 47 which raises a request signal on line 48 as a first input to AND gate 49. When a null slot in the address field on line 52 is detected by null decode logic 51 (line 52 contains the address portion of the address in register 45) it generates a null detect signal on line 53 which is applied to AND gate 49. Gate 49 generates a source enable signal on line 54 which is coupled to selector 55 and causes selector 55 to select the input 56 from asynchronous register 47. The signal on bus 56 is then passed through selector 55 via bus 57 to output register 46. The information is stored in output register 46 and can be clocked out by line 32 onto the output bus 22 coupled to transmitter 19. The source enable signal on line 54 is also coupled to an input of register 47 as an acknowledge signal to clear the request on line 48.

Having explained a detail block diagram of the operation of a preferred embodiment station interface unit 21 which may be incorporated into a station 15 it will be understood that the input to a station 15 may come from another station 15 or from an external data source 16 or from any custom interface that simulates a data source with a clock 17.

Having explained the preferred embodiment of the present invention it will now be appreciated that the novel unidirectional single word protocol eliminates the need for extensive buffering in the source function 24. Further, since the source function 24 is generating addresses and data to be transmitted to another station it is only necessary for the information to be buffered in a synchronous register 47 and to wait for a next null slot word to occur so that the information can be placed on the interconnection bus 22 of the network.

In the preferred embodiment of the present invention priorities are preferably not assigned to the individual stations 15. In the preferred embodiment priorityless mode of operation the systems designer can add more source functions units 15 until the complete full bandwidth of the system is utilized. When further bandwidth is required it is only necessary to increase the frequency of the systems clock. In designing the novel system it is important to note that the logic shown in FIG. 4 may be implemented in different semiconductor device and speed technology such as TTL, ECL and Gallium Arsenide so that the full bandwidth may be increased according to need.

Further it will be noted that the sink decode logic 37 can be programmed with multiple addresses by the microprocessor control 38 and can be programmed with variable width address fields. The fact that the preferred embodiment interface unit has been explained with reference to an address and data field of only 24 bits should not limit the width of a word which is not constrained to 24 bits and is expandable to the limits of the hardware used. A feature of the present invention is that the pass through logic can be enabled which permits a pass through of the same address and data information that is routed to one sink function 23 to be routed to a plurality of different stations 15.

Another feature of the present invention results from the fact that the sink function precedes the source function in time sequence thus permitting the sink function to remove information having a specific address and the source function to reuse the same word to communicate with a station 15 further down the line. Further, it will be appreciated that the information being supplied to the interface 21 from the source 16 is inputted into input register 31, buffered in a buffer register 45 and presented as an output from output register 46 in three discrete bit times, thus the daisy chaining of the novel interface 21 does not impose a significant logic delay on the operation of the system.

What is claimed is:

1. A parallel bit word interface unit for connection to a bus, comprising:
   input phase adjuster means for adjusting the input data phase to provide stable input data,
   input register means coupled to the output of said input phase adjuster means for receiving single parallel bit words having an address field and a data field,
   sink decoding means coupled to the output of said input register means for comparing stared addresses with the address field of said single parallel bit words and having an enable signal generation means, sink buffer register means coupled to the output of said input register means and to said enable signal generation means for storing the data field of said single parallel words when enabled by said sink decoding means, buffer storage means coupled to the output of said input register means for receiving and storing said single parallel bit words, output register means coupled to said buffer storage means for receiving and storing single parallel bit words to be passed onto a bus from said interface unit, pass through decoding means coupled to the output of said sink decoding means for generating a disable signal, and zero address generation means coupled to the output of said pass through decoding means for filling and storing the address field of said output register means with zeros when not disabled by said pass through decoding means.

2. A parallel bit word interface unit as set forth in claim 1 wherein said pass through decoding means comprises means capable of disabling said zero address generation means.

3. A parallel bit word interface with as set forth in claim 2 wherein said pass through decoding means comprises means for disabling said zero address generation means when enabled by said sink decoding means.

4. A parallel bit word interface unit as set forth in claim 3 which further includes, bit word data source means coupled to said input register means.

5. A parallel bit word interface unit as set forth in claim 4 which further includes, parallel bit word transmitter means coupled between said data source means and said input register means.

6. A parallel bit word interface unit as set forth in claim 5 which further includes, second bit word transmitter means coupled to the output of said output register means.

7. A parallel bit word interface unit as set forth in claim 6 which further includes means for connecting said bit word transmitters to a bus to effect coupling of said interface unit to said bus.

8. A parallel bit word interface unit as set forth in claim 2 which further includes, microprocessor means coupled to said pass-through decoding means and to said sink decoding means for programming their field address addresses.

9. A parallel bit word interface unit as set forth in claim 1 which further includes, selection means coupled to the output of said buffer storage means and having an output coupled to the input of said output register means, said selection means being transparent to parallel bit words having an address stored in said address field.

10. A parallel bit word interface unit as set forth in claim 9 which further includes, asynchronous register means coupled to the input of said selection means, and gate enables means coupled to field address of said buffer storage means and to said asynchronous register means for enabling said selection means to store new parallel bit words in said asynchronous register means in said output register means when a null address is stored in the parallel bit word in said buffer storage means.

11. A parallel bit word interface unit as set forth in claim 10 which further includes, host word source means coupled the output said sink buffer register means and to said asynchronous register means for generating said new parallel bit words.

12. A parallel bit word interface unit as set forth in claim 11 wherein said host word source means comprises a source function register for generating said new parallel bit words.

13. A parallel bit word interface unit as set forth in claim 10 which further includes a host processor means coupled to said sink functions means and source function means, said sink function means being coupled to the output of said sink buffer register means and to the output of said source function means, and said source function means being coupled to an input of said asynchronous register means for storing said new parallel bit word in said asynchronous register means.

* * * * *